United States Patent [19]

Cseh

[11] 4,065,449
[45] Dec. 27, 1977

[54] TETRACHLORO SUBSTITUTED DISAZO PIGMENTS

[75] Inventor: Georg Cseh, Arlesheim, Switzerland

[73] Assignee: Ciba-Geigy Corporation, Ardsley, N.Y.

[21] Appl. No.: 639,560

[22] Filed: Dec. 10, 1975

[30] Foreign Application Priority Data

Dec. 17, 1974 Switzerland .................. 16812/74

[51] Int. Cl.² .............................................. C09B 33/14
[52] U.S. Cl. ...................................... 260/176; 260/140; 260/208; 106/288 Q
[58] Field of Search .................................... 260/176

[56] References Cited

U.S. PATENT DOCUMENTS 1,505,568  8/1924  Laska et al. ................. 260/176 X

FOREIGN PATENT DOCUMENTS 2,243,955  3/1973  Germany ........................ 260/176

Primary Examiner—Charles F. Warren

[57] ABSTRACT

Disazo pigments of the formula

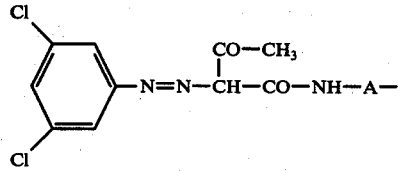

-continued

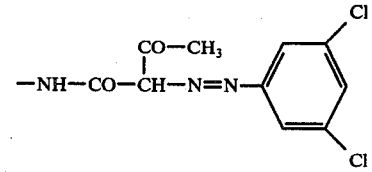

wherein A represents a carbocyclic or heterocyclic aromatic radical, in particular, those of the formula

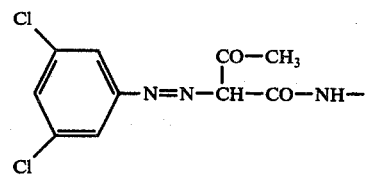

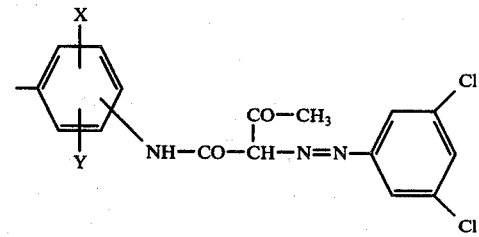

wherein each of X and Y represents a hydrogen or a halogen atom, an alkyl or alkoxy group of 1 to 6 carbon atoms, an aryloxy, trifluoromethyl, nitro, cyano, carboxylic ester or carboxy amide group, or wherein X and Y together represent a fused benzene ring are valuable pigments coloring plastics and lacquers in yellow to orange shades of excellent fastness properties.

1 Claim, No Drawings

TETRACHLORO SUBSTITUTED DISAZO PIGMENTS

The present invention provides new useful disazo pigments of formula

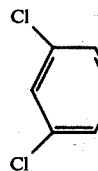
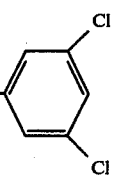

(I)

wherein A represents a carbocyclic or heterocyclic aromatic radical.

Of particular interest are disazo pigments of formula

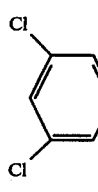
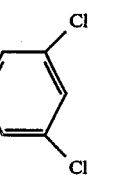

(II)

wherein each of X and Y represents a hydrogen or a halogen atom, an alkyl or alkoxy group of 1 to 6 carbon atoms, an aryloxy, trifluoromethyl, nitro, cyano, carboxylic ester or carboxy amide group, or wherein X and Y together represent a fused benzene ring, and, in particular, those of formula

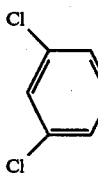
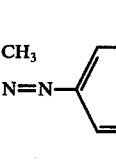

(III)

wherein $X_1$ and $Y_1$ represent hydrogen or chlorine atoms, alkyl or alkoxy groups of 1 to 4 carbon atoms.

Particularly preferred disazo pigments are those of formula III, wherein $X_1$ and $Y_1$ represent hydrogen or chlorine atoms, methyl or methoxy groups, but primarily those wherein $X_1$ represents a chlorine atom and $Y_1$ represents a chlorine atom or a methoxy group.

The pigments of the present invention are obtained by coupling diazotised 3,5-dichloroaniline with a compound of formula $$CH_3COCH_2CONH-A-NHCOCH_2COCH_3,$$

wherein A is as defined in formula (I), in the molar ratio 2:1.

The coupling components preferably have the formula

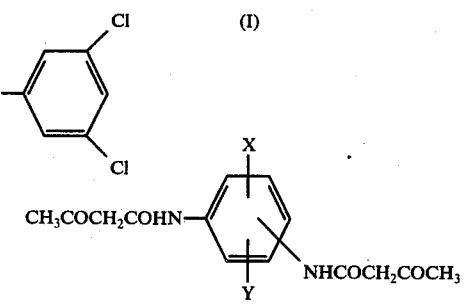

(IV)

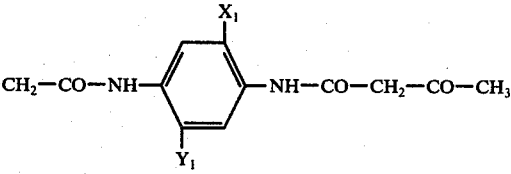

(V)

wherein $X_1$ and $Y_1$ are as defined hereinbefore.

Particularly interesting compounds are those of formula (V), wherein $X_1$ and $Y_1$ represent hydrogen or chlorine atoms, methyl or methoxy groups, and above all those wherein $X_1$ represents a chlorine atom and $Y_1$ represents a chlorine atom or a methoxy group.

The coupling components are obtained in simple manner by treating the corresponding diamines, for example the following, with diketene or acetoacetic ester:

1,4-phenylenediamine
2-chloro-1,4-phenylenediamine
2-methyl-1,4-phenylenediamine
2-methoxy-1,4-phenylenediamine
2-ethoxy-1,4-phenylenediamine
2-propoxy-1,4-phenylenediamine
2-isopropoxy-1,4-phenylenediamine 2-butoxy-1,4-phenylenediamine
2-nitro-1,4-phenylenediamine
2-cyano-1,4-phenylenediamine
2-methoxycarbonyl-1,4-phenylenediamine
2-ethoxy-carbonyl-1,4-phenylenediamine
2-trifluoromethyl-1,4-phenylenediamine
2-aminocarbonyl-1,4-phenylenediamine
2,5-dichloro-1,4-phenylenediamine
2,5-dibromo-1,4-phenylenediamine
2,5-dimethyl-1,4-phenylenediamine
2,5-dimethoxy-1,4-phenylenediamine
2,5-diethoxy-1,4-phenylenediamine
2,5-dipropoxy-1,4-phenylenediamine
2,5-bis-trifluoromethyl-1,4-phenylenediamine
2-chloro-5-methyl-1,4-phenylenediamine
2-chloro-5-methoxy-1,4-phenylenediamine
2-chloro-5-ethoxy-1,4-phenylenediamine
2-methyl-5-methoxy-1,4-phenylenediamine
2-methyl-5-ethoxy-1,4-phenylenediamine
2,6-dichloro-1,4-phenylenediamine
2,3,6-trichloro-1,4-phenylenddiamine
2,3,5,6-tetrachloro-1,4-phenylenediamine
2,3,5,6-tetramethyl-1,4-phenylenediamine
1,3-phenylenediamine
4-chloro-1,3-phenylenediamine
4-methyl-1,3-phenylenediamine
4-methoxy-1,3-phenylenediamine
2,5-dichloro-1,3-phenylenediamine
4,6-dichloro-1,3-phenylenediamine
4,6-dimethyl-1,3-phenylenediamine
1,5-naphthylenediamine
1,4-naphthylenediamine
2,6-naphthylenediamine
4,4'-diamino-diphenylmethane
4,4'-diamino-diphenylether
4,4'-diamino-diphenylamine
2,2',5,5'-tetrachlorobenzidine
o-tolidine
o-dianisidine.

The coupling preferably takes place in a weakly acid medium, advantageously in the presence of conventional agents that promote the coupling. As such there may be mentioned in particular dispersants, for example aralkylsulphonates, such as dodecylbenzenesulphonate, or 1,1'-dinaphthylmethane-2,2'-disulphonic acid or polycondensation products of alkylene oxides. The dispersion of the coupling component can also advantageously contain protective colloids, for example methylcellulose or minor amounts of inert organic solvents which are sparingly soluble or insoluble in water, for example optionally halogenated or nitrated aromatic hydrocarbons, for example, benzene, toluene, xylene, chlorobenzene, dichlorobenzene or nitrobenzene, and also aliphatic halogenated hydrocarbons, for example, carbon tetrachloride or trichloroethylene, and furthermore organic solvents which are miscible with water, for example, acetone, ethylene gylcol monomethyl ether, methyl ethyl ketone, methanol, ethanol or isopropanol.

The coupling can also advantageously be carried out by continuously combining an acid solution of the diazonium salt with an alkaline solution of the coupling component in a mixing nozzle, whereupon an immediate coupling of the component occurs. Care must be taken that the diazo component and the coupling component are present in equimolecular amounts in the mixing nozzle, and a slight excess of coupling component proves to be advantageous. This is most simply achieved by controlling the pH of the liquid in the mixing nozzle. Furthermore, intense turbulent mixing of the two solutions in the mixing nozzle must be ensured. The resultant colourant dispersion is continuously drawn off from the mixing nozzle and the colourant separated by filtration.

Owing to their insolubility the pigments obtained can be isololated from the reaction mixtures by filtering them off. It is advantageous to subject the pigments to an aftertreatment with an organic solvent, preferably one that boils above 100° C. Particularly suitable organic solvents are: benzenes which are substituted by halogen atoms, alkyl or nitro groups, for example xylene, chlorobenzene, o-dichlorobenzene or nitrobenzene, as well as pyridine bases, such as pyridine, picoline or quinoline, and also ketones, for example, cyclohexanone; ethers, for example ethylene glycol monomethyl and monoethyl ether; amides, such as dimethyl formamide or N-methylpyrrolidone, as well as sulphoxone.

The aftertreatment is effected preferably by heating the pigment in the solvent to 100° to 150° C, when in many cases an increase in the granular size occurs. The fastness to light and migration of the resultant pigments are thereby favourably influenced.

The coupling can also be carried out by heating a diazoamino compound of the 3,5-dichloroaniline with the diacetoacetylarylenediamine in an aqueous-organic solvent, preferably in the presence of an acid.

The 3,5-dichlorophenyldiazoamino compounds to be used according to the present invention are obtained by known methods by coupling the 3,5-dichlorophenyldiazonium salt with a primary or preferably a secondary amine. The most diverse amines are suitable for this purpose, for example aliphatic amines such as methylamine, ethylamine, ethanolamine, propylamine, butylamine and hexylamine and especially dimethylamine, diethylamine, diethanolamine, methylethanolamine, dipropylamine or dibutylamine, aminoacetic acid, methylaminoacetic acid, butylaminoacetic acid, aminoethanesulphonic acid, methylaminoethanesulphonic acid, guanylethanesulphonic acid, β-aminoethylsulphuric acid, alicyclic amines, for example, cyclohexylamine, N-methylcyclohexylamine and dicyclohexylamine, aromatic amines, for example, 4-aminobenzoic acid, sulphanilic acid, 4-sulpho-1-aminobenzoic acid, (4-sulphophenyl)-guanidine, 4-N-methylaminobenzoic acid 4-ethylaminobenzoic acid, 1-aminonaphthalene-4-sulphonic acid, 1-aminonapthalene-2,4-disulphonic acid, heterocyclic amines such as piperidine, morpholine, pyrrolidine and dihydroindole, and finally also sodium cyanamide or dicyandiamide.

As a rule, the resulting diazoamino compounds are sparingly soluble in cold water and, optionally after salting out, can be isolated from the reaction medium in a crystalline form. In many cases the moist filter cakes can be used for the further reaction. In some cases it can prove advantageous to dehydrate the diazoamides by vacuum drying prior to the reaction, or to remove the water by azeotropic distillation after suspending the moist press cake in a solvent.

The coupling of the diazoamino compound with the naphthol takes place in an organic solvent, for example, chlorobenzene, o-dichlorobenzene, nitrobenzene, pyridine, ethylene glycol, ethylene glycol momomethyl or monoethyl ether, dimethylformamide, formic acid or acetic acid. When using solvents which are miscible with water it is not necessary to use the diazoamino compounds in the anhydrous form. The water-moist filter cakes can, for example, be used. The splitting of the diazoamino compound which precedes the coupling takes place in an acid medium. If neutral solvents are used, the addition of an acid, for example, hydrogen chloride, sulphuric acid, formic acid, acetic acid, chloroacetic acid or propionic acid, is necessary.

The coupling is advantageously carried out at elevated temperature, preferably at a temperature within the range of from 80° to 180° C, and in general takes place very rapidly and completely.

Finally, it is also possible to effect the coupling in such a manner that the 3,5-dichloroaniline is suspended with the coupling component in the molar ratio 2:1 in an organic solvent and the coupling mixture is treated with a diazotising agent, in particular an ester of nitric acid, such as methyl, ethyl, butyl, amyl or octyl nitrite.

The new colourants constitute valuable pigments which, in finely divided form, may be used for pigmenting organic material of high molecular weight, for example cellulose ethers and esters, polyamides and polyurethanes or polyesters, acetyl cellulose, nitrocellulose, natural resins or artificial resins, such as polymerisation or condensation resins, for example aminoplasts, in particular urea and melamine/formaldehyde resins, alkyd resins, phenolic plastics, polycarbonates, polyolefines, such as polystyrene, polyvinyl chloride, polyethylene, polypropylene, polyacrylonitrile, polyacrylic esters, rubber, casein, silicone and silicone resins, individually or in mixtures.

It is immaterial whether the cited materials of high molecular weight are in the form of plastics, melts or in the form of spinning solutions, varnishes, paints or printing inks. Depending on the use to which they are put, it is advantageous to use the new pigments as toners or in the form of preparations.

In addition to the pure pigment, the preparations can additionally contain, for example, abietic acid or esters thereof, ethyl cellulose, cellulose acetobutyrate, alkaline earth salts of higher fatty acids, fatty amines, for example, stearylamine or rosinamine, vinyl chloride copolymers, polyacrylonitrile or polyterpene resins or water-soluble dyes, for example dyestuff sulphonic acids or the alkaline earth salts thereof.

The colourants of the present invention are characeterised by their moderate price, and by good fastness to light, migration and weather. They have good dispersibility, transparency and brilliance, as well as excellent resistance to alkali and high colour strength. Compared with the isomeric disazo pigments disclosed in German Offenlegungsschrift No. 2,243,955, which are obtained by coupling diazotised 2,5-dichloroaniline with bis-acetoacetyl-arylenediamines, they are characterised by improved lightfastness.

In the following Examples which illustrate the invention, the parts and percentages are by weight unless otherwise indicated.

EXAMPLE 1

6.5 parts of 3,5-dichloroaniline are stirred in 300 parts by volume of glacial acetic acid with 10 parts by volume of conc. hydrochloric acid to give the hydrochlorate of the base. The reaction mixture is then cooled to −5° C by adding 300 parts of ice and diazotised by adding 10 parts by volume of 4 normal sodium nitrate. The yellow solution is stirred at 0°–5° C until only traces of nitrous acid are still detectable. The diazo solution is then filtered clear by adding a small amount of decolorising carbon. The filtrate is adjusted to pH by addition of 20 parts of anhydrous sodium acetate.

Simultaneously, 6.1 parts of 2,5-dimethyl-1,4-bis-acetoacetylaminobenzene are dissolved with 8 parts by volume of 40% sodium hydroxide solution in 200 parts of water and 1 part of n-butylsulphoricinoleate is added thereto. This solution is filtered clear with 0.5 part of decolorising carbon and then added dropwise, with good stirring, to the diazo solution in the course of ½ hour and the temperature of the reaction mixture rises to 15°–20° C. After termination of the dropwise addition, no more diazo compound can be detected in the mixture. The coupling mixture is stirred for 1 hour at room temperature, then heated for 1 hour to 80°–85° C and filtered hot. The filter cake is washed free of salt with hot water and dried at 95°–100° C in vacuo to yield 13 parts of a yellow colourant of formula

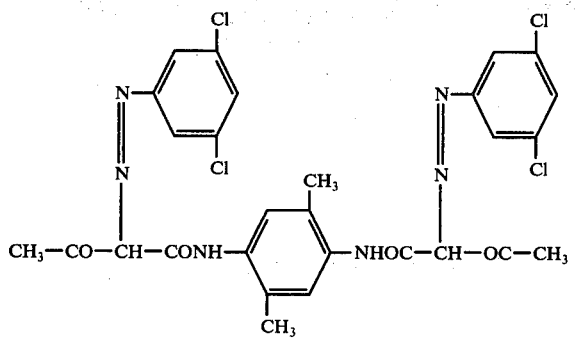

13 parts of this pigment are stirred for 18 hours at 145°–150° C in 400 parts by volume of dimethyl formamide, when it assumes a crystalline form. Microscopic examination reveals fine, yellow particles 5–15 μ in length. After filtration at 140° C, washing with dimethyl formamide until the filtrate runs clear, expelling the dimethyl formamide with ethanol and drying, there are obtained 10.2 parts of a brilliant yellow pigment dye. It colours plastics such as polyvinyl chloride in greenish yellow shades of excellent fastnes to migration. The treatment in the organic solvent can be carried out direct with the moist filter cake without first drying it. The moist filter cake can be stirred in picoline at 100°–120° C, filtered, washed with methanol and subsequently with dilute hydrochloric acid, or it is stirred in chlorobenzene, o-dichlorobenzene or nitrobenzene, and freed from water by azeotropic distillation and then worked up as described hereinabove.

The following Table describes further colourants which are obtained by coupling the diazotised bases of column I with the bisacetoacetic arylides of the diamines of column II. Column III indicates the shade of polyvinyl chloride sheets coloured with 0.2% of these pigments.

| | I | II | III |
|---|---|---|---|
| 2 | 3,5-dichloroaniline | 1,4-phenylenediamine | yellow |
| 3 | " | 2-chloro-1,4-phenylenediamine | greenish yellow |
| 4 | " | 2-methoxy-1,4-phenylenediamine | reddish yellow |
| 5 | " | 2-methyl-5-chloro-1,4-phenylenediamine | yellow |
| 6 | " | 2-methoxy-5-chloro-1,4-phenylenediamine | yellow |
| 7 | " | 2,5-dichloro-1,4-phenylenediamine | greenish yellow |
| 8 | " | 2,5-dimethoxy-1,4-phenylenediamine | orange |
| 9 | " | 2,2'-dichlorobenzidine | greenish yellow |

EXAMPLE 10

2 g of the pigment obtained in Example 1 are ground with 36 g of toner dehydrate, 60 g of boiled linseed oil of medium viscosity, and 2 g of cobalt linoleate on a 3-roll mill. The yellow prints obtained with the resultant colour paste are strong and outstandingly fast to light.

EXAMPLE 11

0.6 g of the pigment manufactured according to Example 1, 67 g of polyvinyl chloride, 33 g of dioctyl phthalate, 2 g of dibutyl tin dilaurate and 2 g of titanium dioxide are mixed together and processed to a thin sheet in a roll mill for 15 minutes at 160° C. The resulting yellow colouration is strong and fast to migration, heat and light.

EXAMPLE 12

10 g of titanium dioxide and 2 g of the pigment manufactured according to Example 1 are ground for 48 hours in a ball mill with 88 g of a mixture of 26.4 g of coconut alkyd resin, 24.0 g of melamine formaldehyde resin (50% solids content), 8.8 g of ethylene glycol monomethyl ether and 28.8 g of xylene.

This lacquer is sprayed on an alumunium sheet, predried for 30 minutes at room temperature and then stoved for 30 minutes at 120° C, to give a brilliant yellow finish which is characterised by good strength and very good fastness to overlacquering, light and weather.

I claim:
1. A disazo pigment of the formula

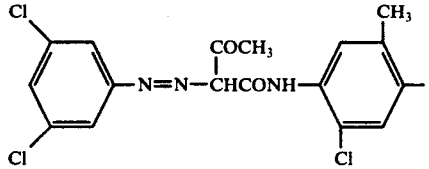

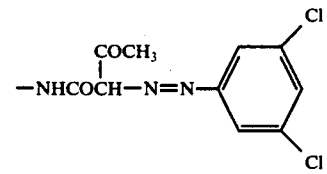

* * * * *